…

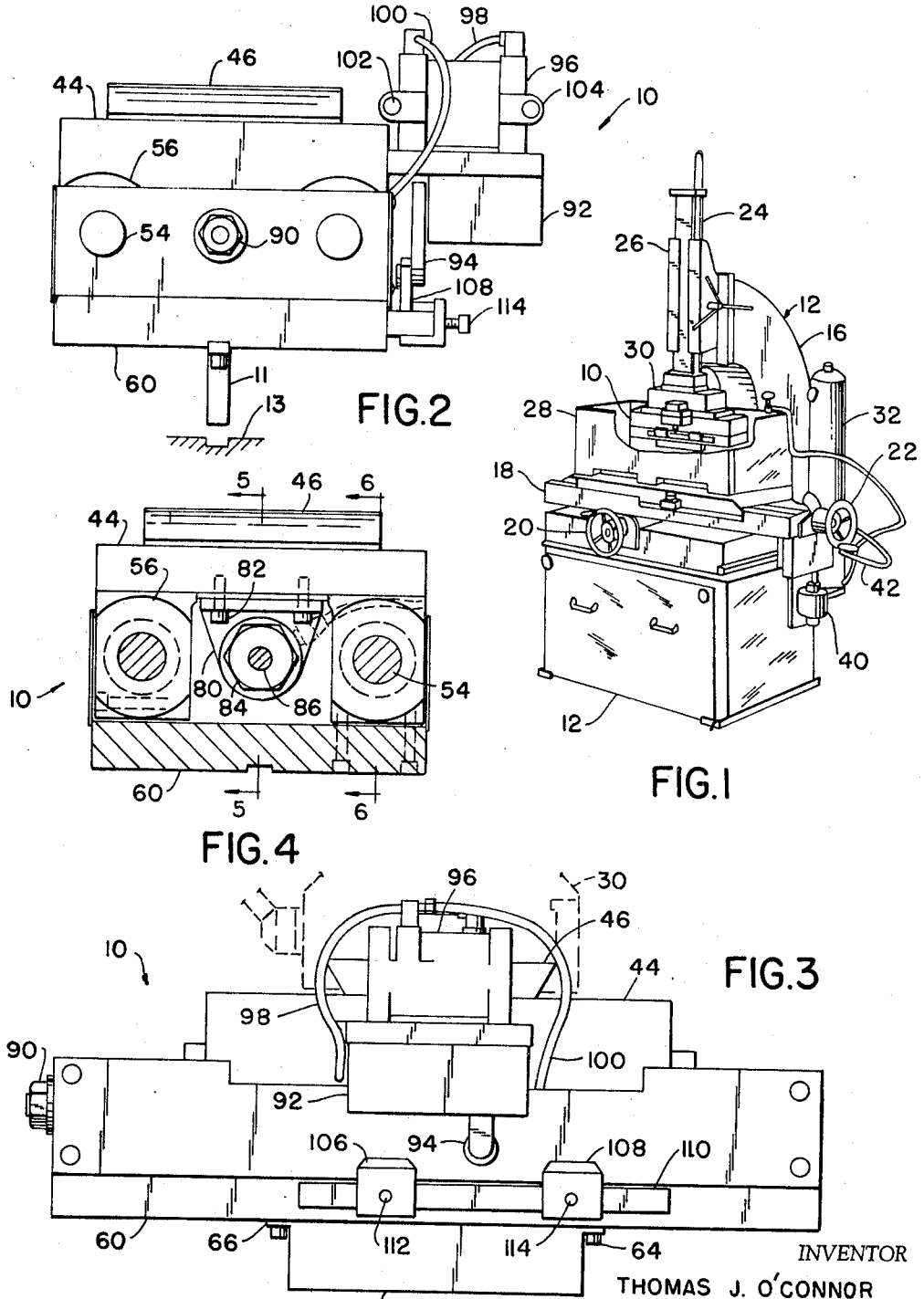

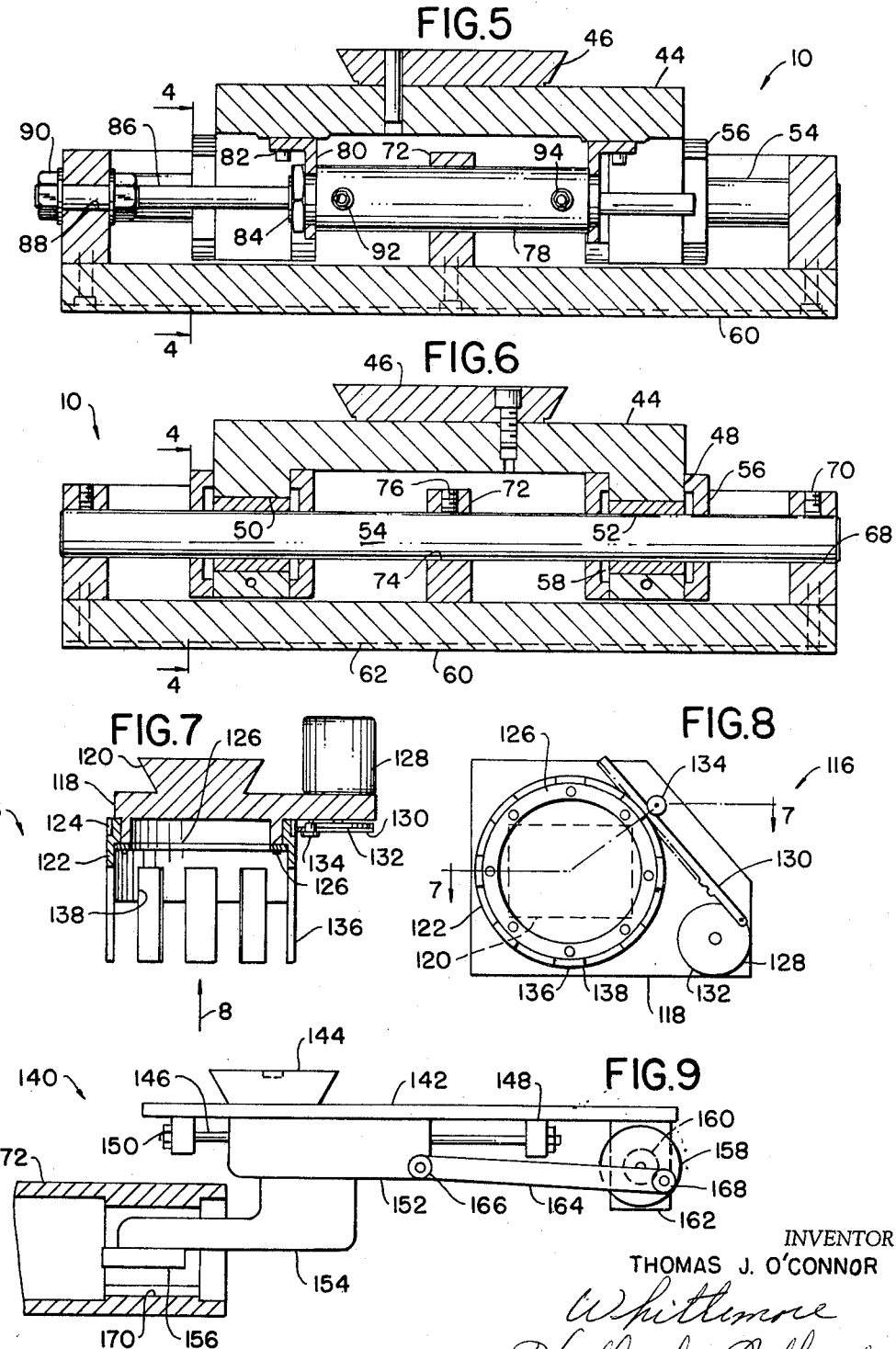

United States Patent Office 3,485,991
Patented Dec. 23, 1969

3,485,991
QUICK-CHANGE TOOL FOR ELECTRICAL
EROSION MACHINING
Thomas J. O'Connor, 100 Morgan Road,
Ann Arbor, Mich. 48104
Continuation-in-part of application Ser. No. 504,971,
Oct. 24, 1965. This application Jan. 8, 1968, Ser.
No. 696,195
Int. Cl. B23k 9/16; B23p 1/00
U.S. Cl. 219—69                                    3 Claims

ABSTRACT OF THE DISCLOSURE

A quick-change tool capable of reciprocating an electrode secured thereto transversely to the direction of movement of the tool toward a workpiece whereby electrical machining is faster and more accurate due to improved flushing without raising the electrode. A dovetail base plate portion is provided for rapidly and accurately mounting the tool.

In one embodiment an electrode mounting member is positioned beneath a base plate on guide shafts extending through the base plate. Piston and cylinder means are secured to the base plate for reciprocating the electrode mounting member. An electric switch is engaged by adjustable stops on the electrode mounting member and actuates an air valve on engagement by the stops to reverse air delivered to the piston and cylinder structure.

In a second embodiment the electrode mounting member is carried on a slide which is mounted on a base plate on guide shafts for reciprocal movement by a motor and a connecting link pivoted to the slide and eccentrically pivoted to a disc rotated by the motor.

In a third embodiment a cylinder is rotatably mounted on the tool base plate for reciprocation by a gear secured to one end of the cylinder and a rack engaged with the gear and eccentrically pivoted to a disc rotated by a motor carried on the base plate. The electrode may be a plurality of arcuate electrodes connected to the other end of the cylinder whereby a circular groove may be cut in a workpiece without the necessity of machining a complete cylindrical thin walled electrode.

CROSS-REFERENCE TO RELATED APPLICATIONS

This application is a continuation-in-part of application Ser. No. 504,971, filed Oct. 24, 1965, now Patent No. 3,363,083, which is a continuation-in-part of application Ser. No. 250,321, filed Jan. 29, 1963, now Patent No. 3,222,494.

BACKGROUND OF THE INVENTION

Field of the invention

The invention relates to electrical machining of conductive workpieces and refers more specifically to a quick-change tool for use with electrical machining apparatus to reciprocate an electrode secured thereto in a direction transverse of the direction of movement of the electrode toward a workpiece being machined thereby.

Description of the prior art

In the past electrical machining has usually been accomplished by electrodes of substantially the same width as the opening or groove cut thereby. Thus, with past structures flushing of the cut area of the workpiece has been difficult, sometimes requiring the backing up of the electrode and subsequent reestablishing of a required machining spark gap. Such procedure is wasteful of time and detrimental to electrical machining tolerances.

SUMMARY OF THE INVENTION

In accordance with the invention there is provided a quick-change tool which is capable of being rapidly and accurately secured to electrical machining apparatus by a tool dovetail base plate portion. The quick-change tool of the invention is capable of imparting reciprocal movement of an electrode secured thereto transversely of a workpiece toward which the electrode is advanced.

The quick-change tool of the invention in one embodiment includes a base plate having a dovetail mounting portion, an electrode mounting member reciprocally secured to the base plate and piston and cylinder means operable between the base plate and electrode mounting member for producing reciprocal movement of the electrode mounting member relative to the base plate.

In a second embodiment of the invention a slide is reciprocally mounted on guide shafts secured to the base plate. An electrode mounting member is carried by the slide and the slide is rotated by a connecting link eccentrically secured to a rotatable disc.

In still another embodiment of the invention the electrode supporting member is a cylinder having a gear portion at one end thereof rotatable by means of a rack engaged therewith at one end and eccentrically pivoted to a rotatable disc at the other end thereof. In this embodiment of the invention a complete circle may be eroded in a workpiece by arcuate electrode sections secured to and extending axially outwardly from the other end of the cylinder.

BRIEF DESCRIPTION OF THE DRAWINGS

FIGURE 1 is a perspective view of a mechanical section of electrical discharge machining apparatus having a quick-change tool constructed in accordance with the invention secured thereto.

FIGURE 2 is an enlarged end elevation view of the quick-change tool illustrated in FIGURE 1.

FIGURE 3 is an enlarged front elevation view of the quick-change tool illustrated in FIGURE 1.

FIGURE 4 is a cross section view of the quick-change tool illustrated in FIGURE 1 taken subtsantially on the line 4—4 in FIGURE 5.

FIGURES 5 and 6 are longitudinal section views of the quick-change tool illustrated in FIGURE 1 taken substantially on the line 5—5 and 6—6, respectively, shown in FIGURE 4.

FIGURE 7 is a longitudinal section view of another embodiment of a quick-change tool constructed in accordance with the invention taken substantially on the line 7—7 in FIGURE 8.

FIGURE 8 is a bottom view of the quick-change tool structure illustrated in FIGURE 7 taken in the direction of arrow 8 in FIGURE 7.

FIGURE 9 is an elevation view of still another embodiment of a quick-change tool constructed in accordance with the invention.

DESCRIPTION OF THE PREFERRED EMBODIMENTS

The quick-change tool 10 for reciprocating an electrode 11 secured thereto transversely of the direction of movement thereof toward a workpiece 13 which is illustrated best in FIGURES 2 through 6, is shown mounted in a mechanical section 12 of electrical discharge machining apparatus in FIGURE 1.

The electrical discharge machining apparatus mechanical section 12 includes the base 14, frame 16 and table 18 on which the dielectric tank 28 is positioned for movement in a horizontal plane along perpendicular axis on rotation of the cranks 20 and 22 which are connected between the base and table and between the table and dielectric tank by means of ball nut and screw mechanisms. A ram 24 is supported in guides for vertical reciprocal movement into and out of the dielectric tank 28 in response to the usual servo drive mechanism of electrical discharge machining apparatus.

The dovetail platen 30 is secured to the ram 24 for movement therewith and functions to facilitate the rapid accurate securing of the quick-change tool 10 to the electrical discharge machining apparatus mechanical section 12. Filter means 32, pump 40 and associated connections 42 for supplying dielectric fluid to the tank 28 and draining fluid therefrom, as required for electrical discharge machining, are included in the mechanical section 12.

As will be understood by those in the art and as more fully explained in the cross-referenced applications and patent and the references cited therein, electrical discharge machining apparatus is completed by a power supply for producing pulsed direct current for application between the workpiece 13 positioned in the dielectric tank 28 and an electrode 11 secured to the tool 10 on the insulated platen 30 and the usual servo motor drive circuit connecting a servo drive motor for the ram 24 in parallel with the spark gap between the electrode carried by the tool 10 and the workpiece operable to maintain a predetermined spark gap. Since such power supplies and servo motor circuits are well known, they will not be considered in detail herein.

The quick-change tool 10 shown in FIGURES 2 through 6 includes a base plate 44 having a dovetail portion 46 at one side thereof and bracket portions 48 extending from the other side thereof at the four corners of the base plate. The bracket portions 48 of the base plate have openings 50 extending therethrough in which bearings 52 for reciprocally mounting guide shafts 54 are secured. The members 56 secure lubricating material 58 adjacent the bearings 52.

A U-shaped electrode mounting member 60 is positioned beneath the base plate 44 and includes a longitudinally extending slot 62 in the bottom thereof in which electrode 11 may be mounted by convenient means, such as for example bolts 64 extending through a mounting portion 66 of the electrode and into the electrode securing member 60. Openings 68 are provided in the opposite ends of the electrode mounting member 60 for receiving the guide shafts 54 therein, as best shown in FIGURE 6. The guide shafts 54 are secured in the openings 68 by the setscrews 70. Upwardly extending members 72 are also provided at each side of the electrode mounting member 60 centrally thereof having an opening 74 extending therethrough in which the shafts 54 are again secured by setscrews 76. Thus, the electrode mounting member 60 is reciprocally mounted on the base plate 44.

Piston and cylinder structure 78, best shown in FIGURE 5, is rigidly secured to the base plate 44 by means of the brackets 80 secured to the base plate 44 by convenient means, such as bolts 82 and to the piston and cylinder structure 78 by nut 84. A piston rod 86 extends through the piston and cylinder structure 78 and is secured to the piston thereof in the usual manner. The piston rod 86 extends through the opening 88 in one end of the electrode mounting member 60 and is secured thereto by convenient means, such as the bolts 90. Thus on alternating the application of, for example, air pressure to the opposite ends of the piston and cylinder structure 78 through the fittings 92 and 94, the electrode mounting member 60 is reciprocated with respect to the base plate 44.

As shown best in FIGURES 2 and 3, an electric limit switch 92 is rigidly secured to the base plate 44 at one edge thereof. The limit switch includes the actuating arm 94. An air valve 96 is also secured to the base plate 44 and operates in conjunction with the limit switch and air lines 98 and 100 connected to fittings 92 and 94 and air supplied thereto through the valve air input openings 102 and 104 to provide air to the piston and cylinder structure 78 for moving the piston rod 86 in opposite directions on closing of the switch 92 by movement of the actuating arm 94 in opposite directions. Adjustable stops 106 and 108 are provided for actuating the switch arm 94 on movement of the electrode mounting member 60 into limiting reciprocal positions relative to the base plate 44. The stops 106 and 108 are slidably mounted on track 110 carried by the electrode mounting member 60 and are secured in predetermined positions by setscrews 112 and 114.

Thus, in operation, with the quick-hange tool 10 secured to the dovetail platen 30 and positioned over a workpiece in the dielectric tank 28 with air under pressure of for example one hundred pounds per square inch connected to the four-way air valve 96, the electrode mounting member 60 will initially move in a direction determined by which of the fittings 92 and 94 are connected to the air supply when the air is applied to the tool 10. On reaching a limiting reciprocal position with respect to the base plate 44, the switch arm 94 will contact one of the stops 106 and 108 to actuate the switch 92. Switch 92 actuates the electrically actuated four-way air valve 96 to supply air to the other fitting 92 or 94 and exhaust air from the fitting to which it originally was supplied, whereby the electrode mounting member 60 is caused to move in the opposite direction until it reaches a limiting reciprocal position in the opposite direction, at which time the switch arm 94 is actuated in the opposite direction to again actuate the switch 92 and the valve 96 whereby the air is again applied to the original fitting 92 and 94. This cycle of movement of the electrode mounting member 60 with respect to the base plate 44 is continuously repeated until the air is removed from the valve 96 or electrical energy is removed from the switch 92.

Thus, as the usual electrical machining is accomplished through downward movement of the ram 24, the electrode 11 secured to the ram 24 by means of the dovetail platen 30 and the tool 10 is reciprocated transversely of the direction of movement of the electrode toward a workpiece, whereby slots longer than the electrode may be machined in a workpiece. In addition, due to the reciprocal movement of the electrode, the slots may be cut faster than with an electrode having a length equal to the slot to be machined since flushing of dielectric through the slot is unobstructed during a portion of each reciprocal movement of the electrode.

The quick-change tool 116 illustrated in FIGURES 7 and 8 again includes a base plate 118 having a dovetail portion 120 by which the tool 116 may be rapidly and accurately secured to the dovetail platen 30 of the electrical machining apparatus mechanical section 12. An electrode mounting cylinder 122 having an external gear portion 124 is reciprocally mounted on the base plate 118 by means of the annular member 126 which may be bolted to the base plate 118.

The cylindrical member 122 is reciprocated angularly by means of the motor 128 mounted on the base plate 118 and rack 130 pivoted at one end to the disc 132 driven by the motor 128 and in engagement with the gear portion 124 of the cylindrical member 122 adjacent the other end thereof. The rack 130 is held in engagement with the gear portion 124 by the post 134 which allows slight radial movement of the rack 130 to prevent binding thereof.

The electrodes 136 secured to the end of the cylindrical member 122 opposite from the base plate have the same curvature as the cylindrical member 122 and are secured to the cylindrical member 122 by convenient means, such as for example tongue and groove structure operable between the electrode shanks and the openings 138 in the cylindrical member for receiving the electrodes. Thus, in operation, a complete thin circular groove may be machined on reciprocation of the cylindrical member while moving the tool 116 in a direction to feed the electrode 136 into a workpiece without the necessity of the difficult machining of a complete thin walled cylindrical electrode.

The quick-change tool 140 illustrated in FIGURE 9 again includes the base plate 142 having a dovetail portion 144 extending from one side thereof by which the tool may be secured to the platen 30. Guide rods 146 are rigidly secured to the base plate 142 by convenient means, such as the brackets 148 and bolts 150. A slide 152 is reciprocally mounted on the guide shafts 146 and supports the electrode mounting member 154 to which the electrode 156 is attached by convenient means, such as bolts (not shown).

The slide 152 is reciprocated on the guide shafts 146 on rotation of disc 158 by means of the servo motor 160 carried by the bracket 162 attached to the base plate 142 through the connecting link 164 pivoted at end 166 to the slide 152 and at end to the disc 158.

In use, the tool 140 permits machining of internal slots 170 in tubular workpiece 172 at a faster rate and with a smaller electrode and less electrode wear than possible without reciprocation of the electrode 156 transversely of the direction of movement of the electrode toward the slot 170.

While three embodiments of the present invention have been considered in detail, it will be understood that other embodiments and modifications are contemplated. It is the intention to include all embodiments and modifications as are defined by the appended claims within the scope of the invention.

What I claim as my invention is:

1. A quick-change tool for use with electrical machining apparatus comprising means for rapidly and accurately securing the tool to electrical machining apparatus, means for securing an electrode to the tool and means operable between the means for securing the tool to the electrical machining apparatus and the means for securing the electrode to the tool for reciprocating the electrode transversely of the direction of movement of the tool toward a workpiece, including a base plate having supporting brackets depending from one side thereof, an inverted U-shaped electrode mounting member positioned adjacent the base plate, bearing rods secured to the ends of the electrode mounting member and passing through the brackets depending from the base plate, piston and cylinder structure secured to the base plate, a piston rod connected to the piston and cylinder structure and secured to one end of the electrode mounting member, and means for driving the piston and cylinder structure in opposite directions alternately.

2. Structure as set forth in claim 1 wherein the means for rapidly and accurately securing the tool to electrical machining apparatus comprises a dovetail portion depending from the other side of the base plate.

3. Structure as set forth in claim 1 wherein the means for driving the piston and cylinder structure in opposite directions alternately comprises a pair of adjustable stops secured to the electrode mounting member, an electric switch secured to the base plate relatively movable with respect to the stops on reciprocation of the electrode mounting member relative to the base plate and engageable therewith for actuating the switch to establish limiting positions of the electrode mounting member relative to the base plate, an electric air valve connected to the switch for actuation thereby to provide reversible air flow to the piston and cylinder structure.

References Cited
UNITED STATES PATENTS

| | | |
|---|---|---|
| 2,479,412 | 8/1949 | Rutter. |
| 2,539,439 | 1/1951 | Kumler. |
| 3,122,628 | 2/1964 | Inoue. |
| 3,135,852 | 6/1964 | Bentley et al. |

JOSEPH V. TRUHE, Primary Examiner

R. F. STAUBLY, Assistant Examiner

U.S. Cl. X.R.
204—143